Figure 1:
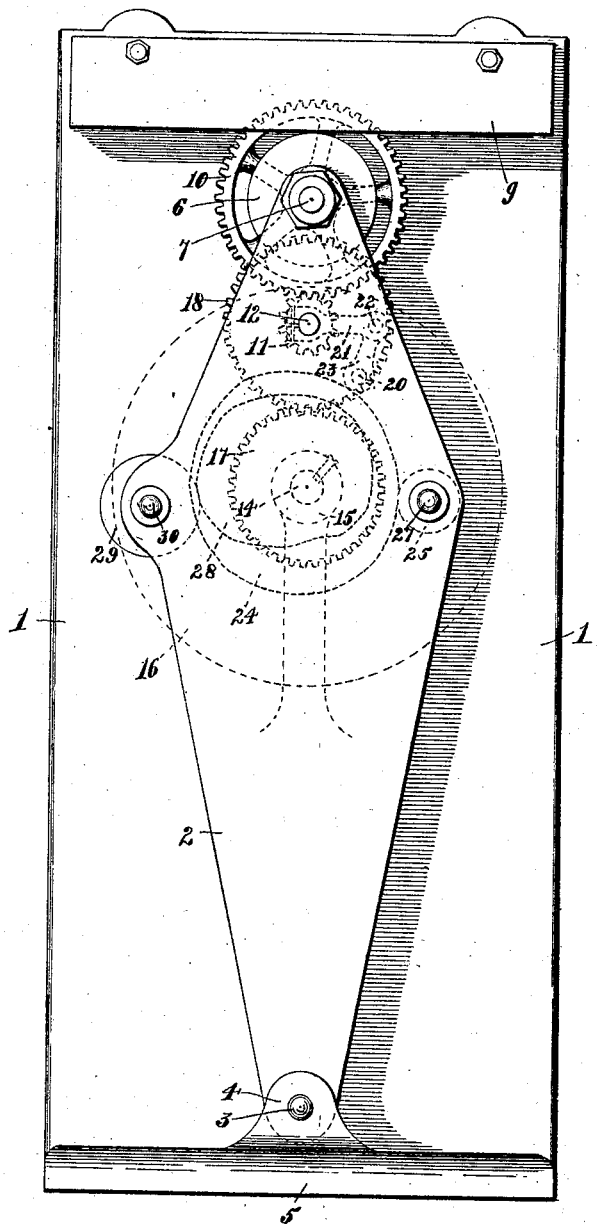

No. 857,832. PATENTED JUNE 25, 1907.
F. H. RICHARDS.
MECHANICAL MOVEMENT.
APPLICATION FILED MAR. 31, 1902.

4 SHEETS—SHEET 1.

Witnesses:
J. G. Hachenberg
C. A. Jarvis.

Inventor:
F. H. Richards.

No. 857,832. PATENTED JUNE 25, 1907.
F. H. RICHARDS.
MECHANICAL MOVEMENT.
APPLICATION FILED MAR. 31, 1902.

4 SHEETS—SHEET 2.

Witnesses:
F. G. Hachenberg
E. A. Jarvis.

Inventor:
F. H. Richards.

No. 857,832. PATENTED JUNE 25, 1907.
F. H. RICHARDS.
MECHANICAL MOVEMENT.
APPLICATION FILED MAR. 31, 1902.
4 SHEETS—SHEET 3.
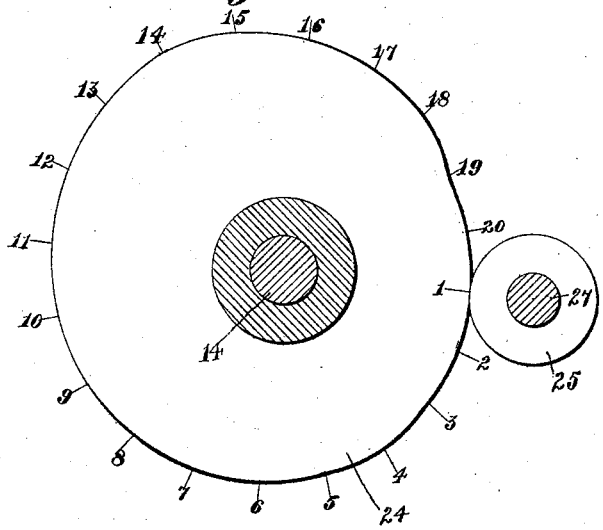
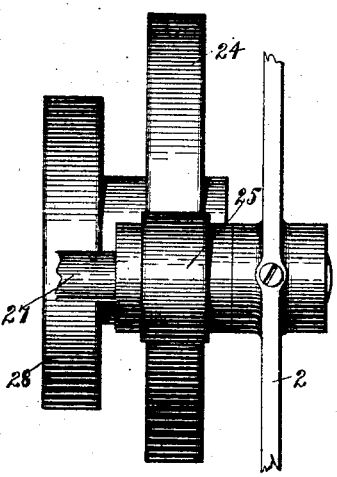
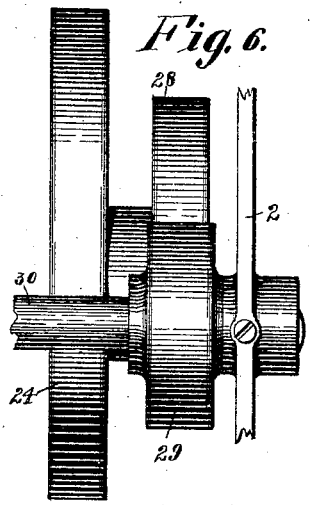
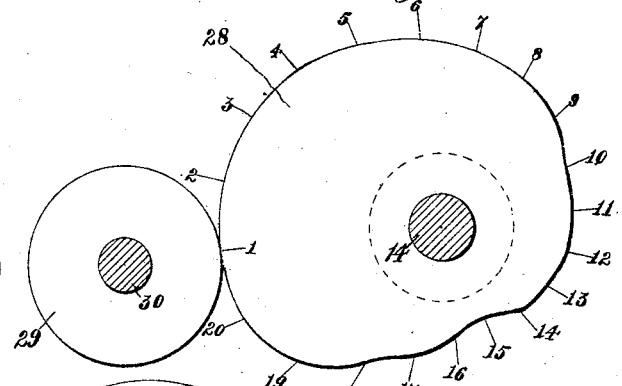
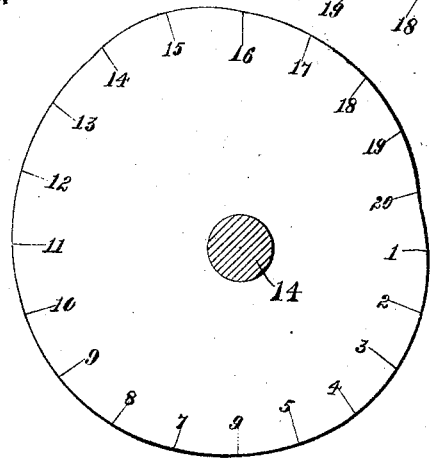
Witnesses:
F. G. Hackenburg
E. A. Jarvis
Inventor:
F. H. Richards No. 857,832.
PATENTED JUNE 25, 1907.
F. H. RICHARDS.
MECHANICAL MOVEMENT.
APPLICATION FILED MAR. 31, 1902.
4 SHEETS—SHEET 4.
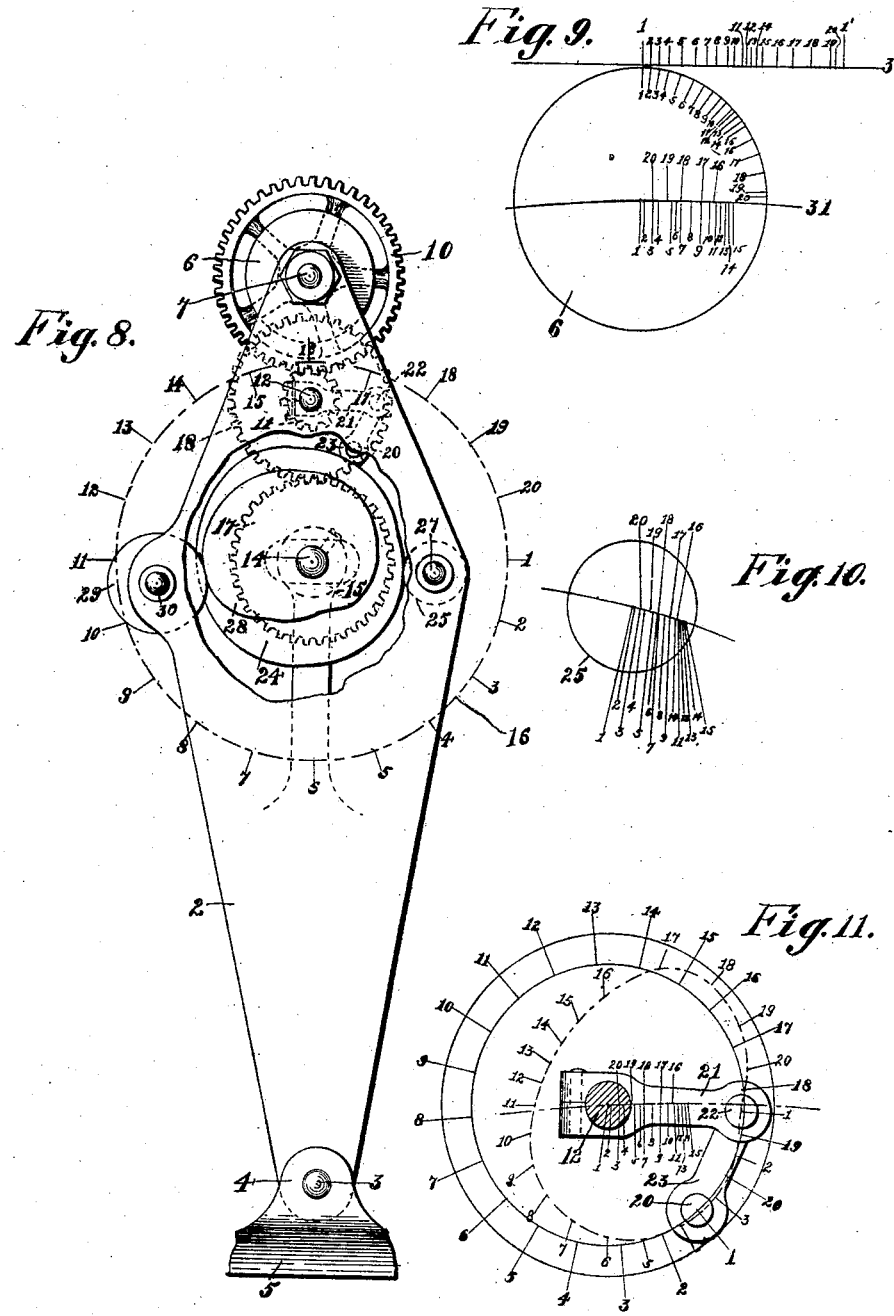
Witnesses:
F. G. Hachenberg.
E. A. Jarvis.
Inventor:
F. H. Richards.

UNITED STATES PATENT OFFICE.

FRANCIS H. RICHARDS, OF HARTFORD, CONNECTICUT.

MECHANICAL MOVEMENT.

No. 857,832.   Specification of Letters Patent.   Patented June 25, 1907.

Application filed March 31, 1902. Serial No. 100,693.

*To all whom it may concern:*

Be it known that I, FRANCIS H. RICHARDS, a citizen of the United States, residing at Hartford, in the county of Hartford and State of Connecticut, have invented certain new and useful Improvements in Mechanical Movements, of which the following is a specification.

My invention pertains to mechanical movements and more particularly to a movement in which a continuously forwardly rotating member is moved along a path tangential to the said member at the concurrent peripheral velocity of said member and back again at a different velocity, and consists of mechanism wherein an alternating member and a continuously forwardly rotating member carried by said alternating member are simultaneously actuated to produce motion of said alternating member in one direction at velocities coincident with the concurrent peripheral velocities of said rotating member and in the reverse direction. And further this invention consists in particular mechanism in which the rotating member carried on the alternating member is continuously driven from a fixed power member through a coupling admitting of varying amount of disalinement between the driving and driven members and which coupling produces variations of the velocities of the driven member during the relative movements of the driving and driven members effecting variations of disalinement and the alternating member is continuously actuated by said fixed power member through complemental mechanism to attain a peripheral travel of the rotating member corresponding with its tangential path during the movement of the alternating member in one direction and a peripheral movement in opposition to its direction of travel along said path during the movement of the alternating member in its other direction.

Some objects of my invention are to provide a mechanical movement productive of a rolling motion along a determined path, and an augmented return motion along said path; to provide mechanism whereby such motion is attained through the agency of constantly active and continuously driven connected instrumentalities and to provide such a mechanism as shall be practically applicable to a feed movement, particularly an intermittent feed movement and especially capable of embodiment as an intermittent feed movement in automatic machinery.

I have illustrated one mechanical structure embodying my invention in the accompanying drawings in which like reference characters denote like parts throughout the several views.

Figure 2:
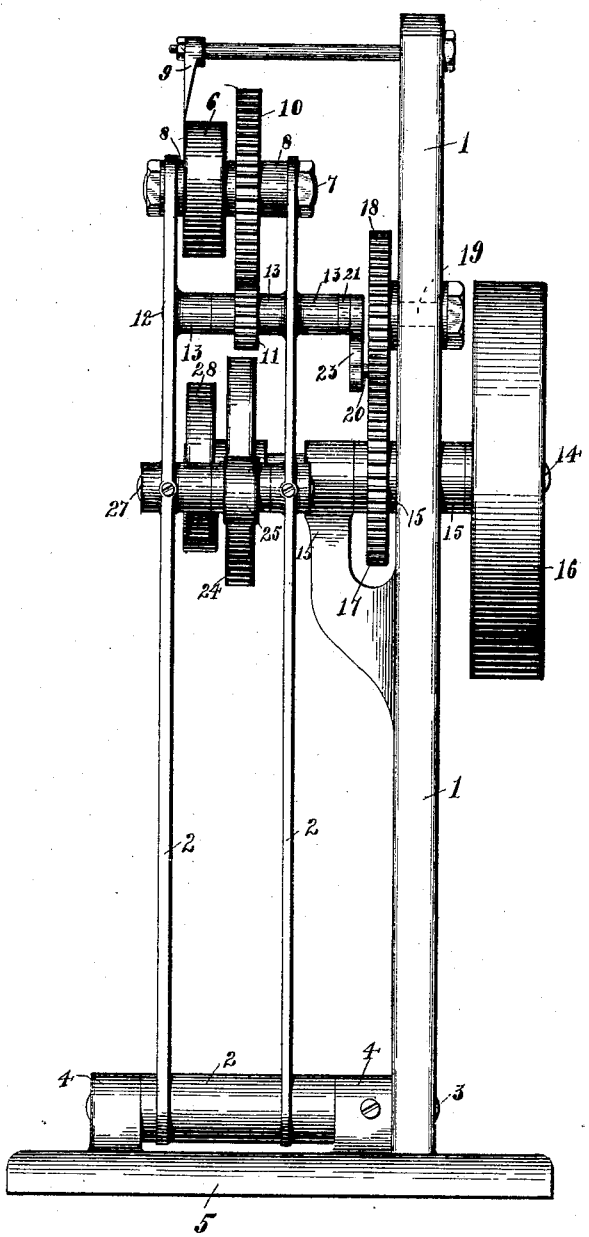

I have shown in Figure 1, an elevational view of a structure embodying my invention, in Fig. 2, a side elevation; in Fig. 3, a detail in elevation of the main operating cam and its roll; in Fig. 4, a right-side elevation of the cams and their rolls; in Fig. 5, a detail in elevation of the complemental cam and its roll; in Fig. 6, a left-side elevation of the cams and their rolls; in Fig. 7, a diagrammatical view of a regular three-quarter one-quarter throw cam; in Fig. 8, I have shown a diagrammatical view of the working parts of the complete structure; in Fig. 9 a diagram of the rotary member as applied to a feed; in Fig. 10 a diagram of the motion of the alternating member, and in Fig. 11, a diagrammatical view of the power coupling and its motion.

Referring to the drawings, the mechanism is assembled on a stationary frame 1. Upon a horizontal portion 5 of said frame is mounted in upstanding bearings 4, a shaft 3 forming the pivotal point of a relatively long oscillating member 2. I have chosen to mount the alternating member to oscillate for mechanical reasons and have made the same of such length that the curvature of its oscillation will be practically imperceptible. A reciprocating member can of course be used in this connection suitably mounted, and its connection with the other elements of the device and the ultimate result obtained will be practically the same. A roll 6 is mounted on a shaft 7, mounted in bearings 8 at the top of the oscillating member 2. A gage 9 is fixed to the frame 1 so that its lower edge is tangent with the periphery of roll 6, and merely serves to indicate the path of the roll 6.

I have chosen to make the periphery of the roll 6 four times the length of the stroke of the alternating member 2, and gear it down for reasons hereinafter appearing.

A gear 10 is mounted on the shaft 7 with roll 6, which gear 10 meshes with a gear 11, one-fourth its diameter, on shaft 12. Shaft 12 is mounted in bearings 13 in the oscillating member 2. A main shaft 14 is relatively mounted in fixed bearings 15, on the frame 1 and is driven by a power pulley 16 carried thereby. A gear 17 mounted on the main shaft 14 meshes with and drives a gear 18 of like diameter loosely mounted on a stud 19 fixed to the frame 1. The gear 18 carries a wrist-pin 20. A crank 21 on shaft 12 carries a wrist-pin 22 and a drag-link 23 connects the wrist-pins 20 and 22. The motion of the gear 18 will be transmitted from the wrist-pin 20 through drag-link 23, wrist-pin 22 and crank 21 to the shaft 12, rotating the same. This drag-link connection allows of the disalinement of the shaft 12 and stud 19 within certain limits, without interfering with the transmission of a rotary motion from the gear 11 to the shaft 12. Therefore it follows that with such connections I can oscillate the frame 2 to a limited extent without interfering with the said transmission of rotary motion, moving the roll 6 to and fro.

I have illustrated the oscillating frame 2 in Figs. 1, 2 and 8 at the extreme left-hand limit of its oscillation (with reference to Fig. 1). If the shaft 12 remained in alinement with the stud 19 the roll 6 would be rotated one-quarter revolution at uniform velocity to one revolution of the main shaft 14, but if the alinement of the said shaft 12 and stud 19 be destroyed the revolution of the main shaft 14 will impart a varying velocity to the roll 6, due to the drag-link connection.

In the device illustrated I have arbitrarily established a relation between the parts in which the roll 6 travels backwardly at velocities equivalent to its concurrent peripheral velocities during substantially three-fourths of a revolution of the main shaft and returns during substantially one-quarter of a revolution of the main shaft.

I cause the oscillating member 2 to rock to and fro by a cam 24, mounted on the main shaft 14, and a roller 25 mounted on the oscillating member 2 travelable on said cam. To attain by these means a backward movement of the oscillating member 2 during three-fourths of one revolution of the drive shaft 14 and a return during the remaining fourth, the said backward movement to be at a uniform velocity, I would have to use a three-quarter-one-quarter cam shown in Fig. 7. In this cam, from the point 20 through 1, 2, 3, etc., to point 15, the periphery would be a perfect spiral, and from the point 15 to the point 20, the cam would be variously shaped to suit the exigencies of the case. However if I use this cam (Fig. 7) it is seen that the roll 6 is carried at a uniform velocity along its path by the oscillating member 2, and as the relative positions of the shaft 12 and stud 19 are constantly changed a rotation of peculiarly varying velocity will be imparted to the roll 6, and the periphery of said roll will not coincide with its tangent path or, to express it more clearly, travel upon said path. In order then, to cause the roll 6 to travel evenly along its path and peripherally coincide therewith, it is necessary to find the velocities at which the oscillating member must move, which will complement the concurrent velocities of the roll 6 and alter the cam shown in Fig. 7 in such manner that it will produce such movement in the oscillating member. The particular cam so altered to perform this function in the device illustrated is shown in Fig. 3 in detail and charactered in the drawings as 24. Fig. 10 shows diagrammatically the relative positions of the oscillating member 2 during one revolution of the main shaft to produce the desired movement.

A loose roller 25 is mounted on a stud 27 fixed on the oscillating member 2, which roller 25 runs on the surface of cam 24 and takes the motion of cam 24 on oscillating member 2. The cam 24 drives the oscillating member 2 during its movement in that direction when the roll 6 peripherally coincides with its path, and I preferably employ a cam 28 which is the complement of cam 24 and which is also mounted on the shaft 14 to drive the oscillating member 2 in its opposite direction through a roller 29, mounted on a stud 30 fixed upon the oscillating member 2 and running on the face of cam 28. The complementary cam 28 is shown in Fig. 5 in detail.

In Fig. 11 I have shown a diagrammatical view in which the path and positions of the shaft 12 are shown relatively to the corresponding positions of the wrist-pin 20, and also the path and relative positions of the wrist-pin 22 during one revolution of the main shaft 14, all correspondingly charactered from 1 to 20.

This movement is particularly well adapted for use as an intermittent feed for automatic machines. When so employed the driving or main shaft is driven from the driving shaft of the machine with which it is associated. As an intermittent feed the roll grips the stock and feeds the stock ahead an amount equal to the sum of the concurrent peripheral movement of the roll and the forward movement of the carrier, and during the return or backward movement of the carrier the roll having peripheral velocities equivalent to the concurrent velocities of the carrier, will simply roll back upon the stock leaving the stock at a standstill during which time the instrumentalities of the automatic machine may operate upon the stock.

The application of this constantly connected movement to an intermittent feed is graphically shown in Fig. 9, in which the circle 6 represents the roll 6, the line 31 the directions of oscillation of oscillating member 2, and the line 32 represents a piece of stock actively gripped by the periphery of roll 6. Between the points 1 and 15, the roll 6 will roll along the stock 32 and the oscillating member will counteract said rolling motion leaving the stock stationary while between the points 15 and 1, the oscillating member will move to the left and the roll 6 will roll the stock also to the left which combination of movement produces a feed of the stock equal to the distance between the points 1 and 1′. During three-fourths the time the stock is left stationary.

Throughout all the figures the relative concurrent positions of the several parts are denoted by the characters 1 to 20 representing the concurrent equal periods in the rotation of the main shaft 14.

I find that by constructing the oscillating member 2 of considerable length the path of the roll 6 approximates a straight line to such a degree that for purposes of practical mechanical construction, it is perfectly feasible in a stock feed and the equivalent to the motion attained with a reciprocating member while such a construction is highly preferable in view of its superior mechanical and operating qualities.

It is obvious that I might employ a roll of one-fourth the diameter of roll 6, mounted directly on shaft 12 for accomplishing the same result but I prefer to use the larger roll in view of its better gripping facilities when used in a feed mechanism.

I do not wish to limit myself to the exact construction shown, but to reserve to myself the benefits to be derived from any construction which embodies the novel principle herein illustrated.

In applying the principle of my invention I may proportion the duration of the rolling movement to that of the return movement to suit the requirements of the particular application desired.

This invention is designed to accomplish practically the same results as that shown in my application Serial No. 99,623 filed March 24, 1902.

Having described my invention, I claim—

1. In a mechanical movement, the combination of a stationary support, a driving shaft mounted in said support, a crank mounted for rotation in said support and driven from said driving shaft, a carrier mounted for a forward and backward movement on said support, a roll rotatably mounted on and carried by said carrier, a second crank mounted for rotation on said carrier and connected with and to drive said roll, a link connecting said first and second cranks and means operatively connecting said driving shaft and carrier to effect a forward and backward movement of said carrier.

2. In a mechanical movement, the combination of a stationary support, a driving shaft mounted in said support, a crank rotatably mounted in said support and driven from said driving shaft with its axis of rotation parallel to that of said driving shaft, a carrier mounted on said support for a forward and backward movement transversely of said driving shaft, a roll rotatably mounted on and carried by said carrier with its plane of rotation parallel to the path of movement of said carrier, a second crank mounted for rotation on said carrier with its axis parallel to that of said roll and connected with and to drive said roll, a link connecting said first and second cranks and means operatively connecting said driving shaft and carrier to effect a forward and backward movement of said carrier.

3. In a mechanical movement, the combination of a stationary support, a driving shaft mounted in said support, a crank mounted for rotation in said support and driven from said driving shaft, a carrier mounted for a forward and backward movement on said support, a roll rotatably mounted on and carried by said carrier, a second crank mounted for rotation on said carrier and connected with and to drive said roll, a link connecting said first and second cranks and adapted to impart a complete rotation to the second crank from a full rotation of the first crank and means operatively connecting said driving shaft and said carrier to effect a forward and backward movement of said carrier within the limit of movement of said rotary-transmission link.

4. In a mechanical movement, the combination of a stationary support, a driving shaft mounted in said support, a crank mounted for rotation in said support and driven from said driving shaft, a carrier mounted for a forward and backward movement on said support, a roll rotatably mounted on and carried by said carrier, a second crank mounted for rotation on said carrier and connected with and to drive said roll, a link connecting said first and second cranks, and cam means operatively connecting said driving shaft and said carrier to effect a forward and backward movement of said carrier.

5. In a mechanical movement, the combination of a stationary support, a driving shaft mounted in said support, a crank mounted for rotation in said support and driven from said driving shaft, a carrier mounted for a forward and backward movement on said support, a roll rotatably mounted on and carried by said carrier, a second crank mounted for rotation on said carrier and connected with and to drive said roll, a link connecting said first and second cranks, and actuators mounted on said driving shaft operatively connected with said carrier to effect a forward and backward movement of said carrier.

6. In a mechanical movement, the combination of a stationary support, a driving shaft mounted in said support, a crank mounted for rotation in said support and driven from said driving shaft, a carrier mounted for a forward and backward movement on said support, a roll rotatably mounted on and carried by said carrier, a second crank mounted for rotation on said carrier and connected with and to drive said roll, a link connecting said first and second cranks, and complemental cams on said driving shaft operatively connected with said carrier to effect a forward and backward movement of said carrier.

7. In a mechanical movement, the combination of a stationary support, a driving shaft mounted in said support, a crank mounted for rotation in said support and driven from said driving shaft, a carrier mounted for a forward and backward movement on said support, a roll rotatably mounted on and carried by said carrier, a second crank mounted for rotation on said carrier and connected with and to drive said roll, a link connecting said first and second cranks, cams on said driving shaft, and loose rolls upon said carrier engaging said cams to effect a forward and backward movement of said carrier.

8. In a mechanical movement, the combination of a stationary support, a driving shaft mounted in said support, a crank mounted for rotation in said support and driven from said driving shaft, a carrier mounted for a forward and backward movement on said support, a roll rotatably mounted on and carried by said carrier, a second crank mounted for rotation on said carrier and connected with and to drive said roll, a link connecting said first and second cranks, complemental cams on said driving shaft, and loose rollers on said carrier engaging said complemental cams to effect a forward and back movement of said carrier.

9. In a mechanical movement, the combination of a stationary support, a driving shaft mounted in said support, a crank mounted for rotation in said support and driven from said driving shaft, a carrier mounted for a forward and backward movement on said support, a roll rotatably mounted and carried by said carrier, a second crank mounted for rotation on said carrier and connected with and to drive said roll, a link connecting said first and second cranks and means driven from said driving shaft and operatively connected with said carrier organized to effect a forward and backward movement of said carrier developing during said backward movement velocities at the point of contact of the roll with its tangential path equivalent to the concurrent peripheral velocities of said roll.

10. In a mechanical movement, the combination of a stationary support, a driving shaft mounted in said support, a crank mounted for rotation in said support and driven from said driving shaft, a carrier mounted for a forward and backward movement on said support, a roll rotatably mounted on and carried by said carrier, a second crank mounted for rotation in said carrier and connected with and to drive said roll, a link connecting said first and second cranks and cam means driven from said driving shaft and operatively connected with said carrier organized to effect a forward and backward movement of said carrier developing during said backward movement velocities at the point of contact of the roll with its tangential path equivalent to the concurrent peripheral velocity of said roll.

11. In a mechanical movement, the combination of a stationary support, a driving shaft mounted in said support, a crank mounted for rotation in said support and driven from said driving shaft, a carrier mounted upon said support to oscillate transversely of said driving shaft, a roll rotatably mounted on and carried by said carrier, a second crank mounted for rotation on said carrier and connected with and to drive said roll, a link connecting said first and second cranks, and means operatively connecting said driving shaft and carrier to effect an oscillation of said carrier.

12. In a mechanical movement, the combination of a stationary support, a driving shaft mounted in said support, a crank mounted for rotation in said support and driven from said driving shaft, a carrier mounted on said support to oscillate transversely of said driving shaft, a roll rotatably mounted on and carried by said carrier, a second crank mounted for rotation on said carrier and connected with and to drive said roll, a link connecting said first and second cranks, and means operatively connecting said driving shaft and said carrier to oscillate said carrier to a sufficiently limited extent to permit at all times the complete rotation of said second crank by said first crank.

13. In a mechanical movement, the combination of a stationary support, a driving shaft mounted in said support, a crank mounted for rotation in said support, a gear train operatively connecting said driving shaft and said crank, a carrier mounted upon said support to oscillate transversely of said driving shaft, a roll rotatably mounted on and carried by said carrier, a second crank mounted for rotation on said carrier, a gear train operatively connecting said roll with said second crank, a link connecting said first and second cranks, complemental cams on said driving shaft and cam rolls on said carrier engaging said complemental cams, said complemental cams configured to effect a forward and backward movement of said carrier within limits permitting at all times the complete rotation of said second crank by said first crank and organized with said roll and connections described to effect a forward and backward movement of said roll developing during said backward movement velocities at the point of contact of the roll with its tangential path equivalent to the concurrent peripheral velocities of said roll.

14. In a mechanical movement, the combination of a stationary support, a driving shaft mounted in said support, a carrier mounted on said support to oscillate transversely of said driving shaft, a roll rotatably mounted upon said carrier, a driving connection between said driving shaft and said roll, permitting the lateral oscillation of the axis of said roll relatively to said driving shaft and a cam on said driving shaft operatively engaging said carrier to effect an oscillation of said carrier.

15. In a mechanical movement, the combination of a stationary support, a driving shaft mounted in said support, a carrier mounted on said support to oscillate transversely of said driving shaft, a roll having rotation upon said carrier, a driving connection between said driving shaft and said roll permitting the lateral oscillation of the axis of said roll relatively to said driving shaft, a cam on said driving shaft operatively engaging said carrier to effect an oscillation of said carrier and organized to develop during the backward movement of said carrier velocities at the point of contact of said roll with its tangential path equivalent to the concurrent peripheral velocities of said roll.

16. In a mechanical movement, the combination of a support, a driving shaft mounted in said support, means mounted for rotation in said support and driven from said driving shaft, a carrier mounted for a forward and backward movement on said support, means rotatably mounted on and carried by said carrier, a crank mounted for rotation on said carrier and connected with said second mentioned means, a link connecting said first and second cranks and means operatively connecting said driving shaft and carrier to effect a forward and backward movement thereof.

17. In a mechanical movement, the combination with a support, of a carrier mounted for forward and backward movement on said support, means for imparting said movements thereto, a roll rotatably mounted on and carried by said carrier, and means for continuously rotating the roll with a tangential speed concurrent with the linear speed of the carrier in at least one of its said movements.

18. In a mechanical movement, the combination with a support, of a driving shaft mounted in said support, a carrier mounted for a forward and backward movement on said support, a roll rotatably mounted on and carried by said carrier, means operatively connecting the driving shaft to said roll, and complemental cams on said driving shaft operatively connected with said carrier formed and timed for effecting a forward and backward movement of said carrier relatively accelerated and retarded.

19. In a mechanical movement, the combination with a support, of a driving shaft mounted in said support, a carrier mounted for a forward and backward movement on said support, and connections between said driving shaft and carrier, embodying a roll rotatably mounted on and carried by said carrier and rotated by said driving shaft the relative timing of the said connections effecting a forward and a backward movement of said carrier and developing during said backward movement velocities at the point of contact of the roll with its tangential path equivalent to the concurrent peripheral velocity of said roll.

20. In a mechanical movement, the combination with a support, of a driving shaft mounted in said support, a carrier mounted on said support to oscillate transversely of said driving shaft, a roll rotatably mounted upon said carrier, a driving connection between said driving shaft and said roll permitting the lateral oscillation of the axis of said roll relatively to said driving shaft, and a cam on said driving shaft operatively engaging said carrier for effecting an accelerated and retarded oscillation of said carrier and justifying the variations in rotation of the roll incident to its oscillation relatively to the driving shaft.

21. In a mechanical movement, the combination with a stationary support, of a driving shaft mounted in said support, a carrier mounted on said support to oscillate transversely of said driving shaft, a rotary roll mounted upon said carrier, a driving connection between said driving shaft and said roll permitting the lateral oscillation of the axis of said roll relatively to said driving shaft, means actuated by the driving shaft for effecting an oscillation of said carrier and timed for developing during the backward movement of said carrier velocities at the point of contact of said roll with its tangential path equivalent to the concurrent peripheral velocities of said roll.

22. In a mechanical movement, the combination with a member and means for continuously forwardly rotating the same and for alternately moving the same perpendicularly of its axis of rotation for developing equivalent concurrent velocities in the periphery of the member in one direction and developing augmented velocities thereof in the opposite direction.

23. In a mechanical movement, the combination with a member, of means for continuously forwardly rotating the said member, means for moving said member along a path tangential thereto at the concurrent peripheral velocity thereof and back again, and comprising mechanism embodying an alternating member and a continuously forwardly rotating member carried by said alternating member, and means for simultaneously actuating these for producing motion of said alternating member in one direction at velocities coincident with the concurrent peripheral velocities of said rotating member and in the reverse direction.

FRANCIS H. RICHARDS.

Witnesses:
    FRED. J. DOLE,
    JOHN O. SEIFERT.